April 14, 1959 M. J. RUDERIAN 2,882,354

DIRECT COUPLED AMPLIFIER UTILIZING SAMPLING METHOD

Filed Feb. 21, 1957 2 Sheets-Sheet 1

INVENTOR.

Max J. Ruderian

April 14, 1959 M. J. RUDERIAN 2,882,354

DIRECT COUPLED AMPLIFIER UTILIZING SAMPLING METHOD

Filed Feb. 21, 1957 2 Sheets-Sheet 2

INVENTOR.

Max J. Ruderian

United States Patent Office 2,882,354

Patented Apr. 14, 1959

2,882,354

DIRECT COUPLED AMPLIFIER UTILIZING SAMPLING METHOD

Max J. Ruderian, Santa Monica, Calif.

Application February 21, 1957, Serial No. 641,708

2 Claims. (Cl. 179—171)

This invention relates to direct coupled amplifiers, and more particularly to a direct coupled amplifying arrangement wherein limitless amount of voltage or current amplification may be obtained between input and output circuits without the necessity of amplifying elements, for example, of the types known as vacuum tubes or transistors. In one mode of operation, an input voltage to be amplified is compared with the smaller of two externally applied fast varying voltages, and the larger of these two varying voltages is sampled during the short time interval in which the two compared voltages are of equal magnitudes; the sampled voltage is then identified as the magnified voltage. In one of its advantages over previously known arrangements, the ratio between the larger and smaller varying voltages may inherently be pre-determined, for example, by a pre-determined tap across an impedance means, so that the gain factor of voltage amplification may be pre-fixed without being subject to the commonly encountered variables, for example, power supply variations, and gain factor changes in non linear elements for amplification. In another of its advantages, the novel amplifying arrangement will provide amplification or either D.-C. or A.-C. voltages, without subject to alteration in its basic structure.

In the preferred embodiment of the present invention, one exemplary method of voltage amplification may comprise the following steps: Producing a signal voltage to be amplified; producing auxiliary first and second identically varying voltages at first and second pre-fixed magnitudes, and at a frequency rate equal to or higher than the highest frequency rate that may occur in the signal voltage; comparing the magnitudes of the signal voltage with that of the first varying voltage; selecting the time interval during which the magnitudes of the two compared voltages are of equal values; and sampling said second varying voltage during said selected time interval, thereby producing a magnified signal voltage whose gain factor is pre-determined.

In view of the foregoing brief description, the objects and purpose of the present invention may now be understood from the following detailed description of certain illustrative embodiments showing the preferred mode of carrying it into useful application, and the claims appended hereto will then define the invention not only as embodied in these illustrative examples, but also in a scope to embrace other forms which it is capable of assuming in practice.

Figure 1:
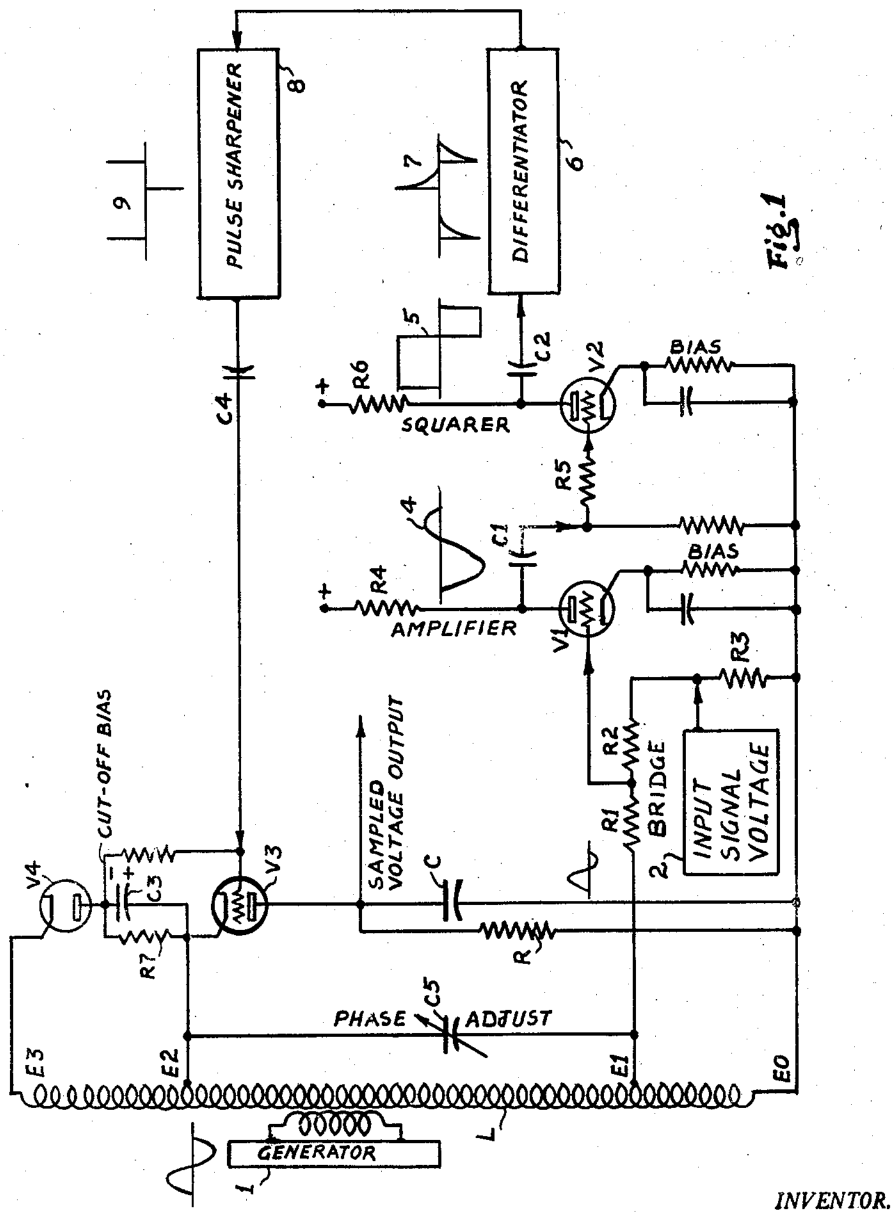
Figure 3:
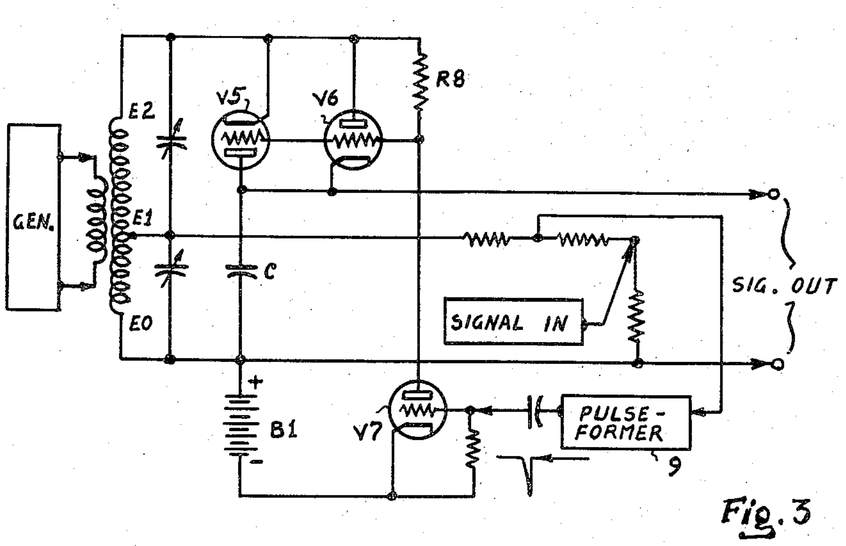
Figure 2:
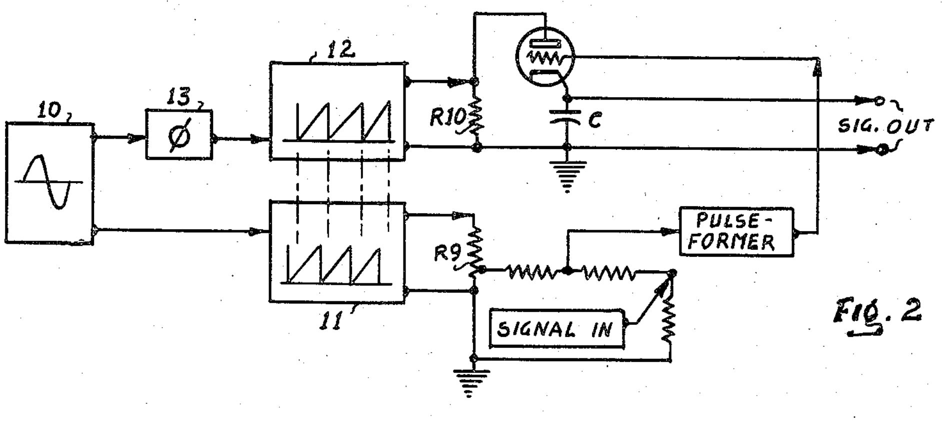
Figure 4:
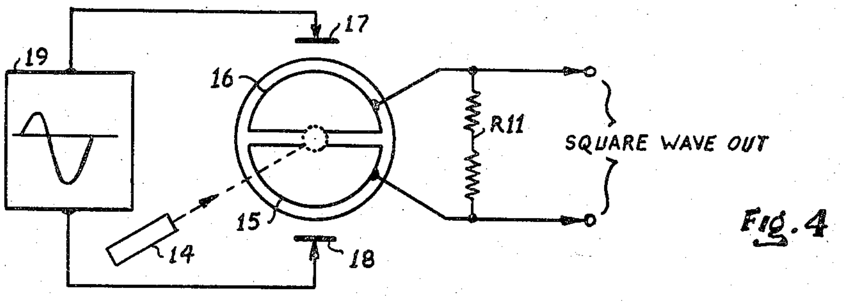

In the drawings: Fig. 1 illustrates partly schematic and partly block diagram of the amplifier in accordance with the invention; and Figs. 2, 3 and 4 are modifications thereof.

Referring now in more detail to Fig. 1, an auxiliary voltage wave is first produced in generator block 1. This voltage wave may be in the form of pure sine wave; distorted sine wave; or in modified form, a saw-tooth wave. The frequency of this voltage wave is not critical, and it may be adjusted, for example, at approximately 50 times higher than the highest frequency that may occur in the signal voltage to be amplified. The output of this voltage wave generator is induced in inductance L inductively, and it is divided into three pre-determined peak values, as indicated at the tapped terminals, E1, E2 and E3, with respect to the voltage appearing at E0 at any given instant. The voltage ratio between E1 and E2 may be pre-fixed by moving the tap at E1, the adjustment of which will inherently determine the exact amount of voltage gain that the amplifier is required to produce. The input signal voltage, to be amplified, is produced in block 2, and its output is applied upon the impedance R3, which may either be of resistive or inductive component, depending upon the type of signal voltage that is prearranged to appear in block 2, for example, D.C. voltage or A.C. voltage. The signal voltage arriving from across R3 and the varying voltage from across L are bridged with respect to each other by the resistors R1 and R2, the values of which are adjusted approximately equal at the centre terminal outgoing to the control grid of amplifying tube V1. As will be noted in this arrangement, when the input signal voltage is zero, the grid of V1 will receive zero potential at the exact zero crossing of the sine wave of voltage E1. Whereas, any positive potential that may arrive from block 2 will shift this zero crossing proportionally toward the negative lobe of the sine wave of voltage E1, for example, as shown graphically in phase-inverted form by the wave 4.

As indicated briefly in the foregoing, the sampling action must take place at the exact balancing point of the signal voltage across resistor R3 and the varying voltage E1 across inductance L. Since at this balancing point the control grid of V1 will receive zero potential, a short pulse may be formed at this point to impart the sampling process of the varying voltage E2. The absolute accuracy of the sampling process is, however, dependent upon the infinite narrowness of the pulse to be formed; but satisfactorily narrow pulses may be obtained by presently known techniques to render the system disclosed herein operable from zero to a wide band of frequencies for amplification. The simplest form of obtaining these narrow pulses may be described as in the following.

The anode circuit of V1 comprises a load resistor R4 and a coupling capacitor C1. As was stated above, the output waveform of the voltage across capacitor C1 will be as shown by the wave 4. This voltage is applied upon the control grid of a wave-squaring tube V2, which for example, may be arranged to limit the anode current flow at the starting point of grid current flow by the current-limiting resistor R5, and also to cut off anode current by a large negative voltage arriving upon its control grid arriving from C1. When the characteristics of grid potential swing versus anode current swing of tube V2 is chosen to satisfy this particular function, and a large potential swing is made to arrive from capacitor C1, the voltage waveform at the anode circuit of V2, comprising resistor R6 and coupling capacitor C2, will then be shaped in the approximate form of square wave 5; the negative waves being narrower in width than the positive waves. This square wave may now be differentiated in block 6, in the waveform as shown at wave 7. Differentiator circuits are well known in the art of electronics, for example, in its simplest form, when the coupling capacitor C2 is chosen to have high impedance at the frequency of wave generator 1, then the voltage waveform across R6 will be in the form of square wave 5, and the waveform at the output of capacitor C2 will be in the form of differentiated wave 7, due to the fact that, during the rise time of wave 5 the impedance of C2 being low will follow its rise, and fall to zero value immediately therefrom, with reversal in polarity when forming similar pulse during the reversal in polarity of square wave 5. It is thus seen that short signal pulses may be produced by conventional means at the zero balancing time intervals between the voltages across resistor R3 and the voltage E1 across inductance L. These pulses may be further sharpened in block 8, as shown by the wave 9, for example, utilizing only the very sharp peaks of the differentiated wave 7, or by adding high speed trigger circuits for furthering the sharpness of these pulses. The technique of pulse sharpening is known in the art of electronics, and in view of above given exemplary systems, further illustrative diagrams or description is not necessary to be given herein. It may be added, however, that the pulses in negative direction (of either wave 7 or wave 9) may be either eliminated completely, or reversed in polarity, for example, by first rectifying and then changing to positive pulses, so that the final sampling process may be imparted by both the negative and positive pulses of waves 7 or 9.

Up to this point the descriptive matter has been directed to the formation of narrow pulses at the voltage balancing points between the signal voltage and the varying voltage E1. These pulses are now ready to impart sampling process of the varying voltage E2, in magnified level, the process of which may be described as follows.

The output terminal tap at voltage E2 across inductance L is electrically connected to the cathode end of a grid controlled vacuum tube V3. The anode element of this tube is connected to the common terminal E0 of inductance L, in series with parallel-connected storage capacitor C and loading resistor R. The anode current of V3 is normally cut off by a large negative bias upon its control grid, for example, as received from the negatively charged terminal of storage capacitor C3. For convenience, this negative bias potential is derived from the voltage E3 of inductance L, through diode V4 in series with the capacitor C3, the latter of which is loaded with parallel-connected resistor R7, for stabliizing its stored potential. Of course, various other forms and modifications may be utilized in obtaining this negative bias potential, and the illustration as shown is merely given as a convenient form of obtaining the necessary bias potential. The output of pulse sharpener block 8 is coupled with the control grid of V3 through coupling capacitor C4, so that the positive pulses of wave 9 may now operate the tube V3. Each time the tube V3 is rendered conductive by a short positive pulse arriving from C4, the capacitor C is charged in magnitude equal to the instantaneous potential appearing at E2 of inductance L. This charged-potential in capacitor C then represents a magnified potential of the original signal-potential in block 2, in definitely known proportion according to the known ratio between voltages of E1 and E2, as described in the foregoing. The time constant of R and C may be chosen according to the particular requirement, for example, depending upon the frequencies that occur at the input signal voltage in block 2; in the same manner as practiced in detecting audio or video signals in conventional broadcast receiver systems.

As mentioned in the foregoing, operating time interval of the charger tube V3 must coincide exactly with the time interval during which the voltage across balanced resistors R1 and R2 is zero. As is commonly encountered in signal amplification techniques, the output phase delay with respect to the origin of signal formation increases with increased number of reactive component parts employed. To remedy this delay in transmitting the output pulses of block 8 to the control grid of charger tube V3, the voltage of E2 may be pre-phased by tuning capacitor C5 (assuming that the frequency of oscillation in block 1 is constant), so that the voltage of E2 will lag in phase with respect to the voltage E1 by the exact amount of phase delay that said pulses arrive at the grid of V3. This phase compensation may not be considered as the ideal (due to non-linear voltage generated in L), but it may be approximated by utilizing the approximately linear portion of the sine wave generated in inductance L.

As shown in the drawing of Fig. 1, the capacitor-charging tube V3 is so polarized that only negative potential of the sine wave across L will render it operative. For this reason, the input voltage arriving from block 2 is assumed to be in positive polarity, so as to obtain zero potential balancing effect. This condition could be reversed, however, for example, by reversing the polarity of the charging tube V3, with appropriate negative bias applied to its control grid for operation in the previously described manner. It is also possible to arrange the circuit of Fig. 1, so that the voltage developed across C could either be in positive or negative polarity, one of various arrangements of which is shown in Fig. 3.

The output signal voltage developed across C, in Fig. 3, is conducted through charger tubes V5 and V6 which are coupled with C and L in opposite poles, e.g., the anode of V5 is connected to cathode of V6, and the anode of V6 is connected to the cathode of V5. These charger tubes V5 and V6 are normally rendered anode current cut off by the application of a high negative bias upon their control grids from across resistance R8. This resistor is connected in the anode circuit of normally conducting tube V7, so that the normal current flow through resistor R8 develops the required negative bias potential. When a negative pulse arrives upon the control grid of V7 from pulse former block 9, in the same manner as described by way of Fig. 1, the tube V7 becomes inoperative and effects zero bias upon the control grids of V5, V6, which in turn charge or discharge capacitor C depending upon the polarity of E2 at that given instant. According to the arangement of Fig. 3, it is preferable that the D.-C. voltage supply B1 be higher in amplitude than the peak amplitude of the A.-C. voltage taking place in inductance L, so that during the negative lobe the tube V7 will still receive positive potential upon its anode circuit for conduction.

Instead of utilizing a sine wave, as the sampling voltage, it may be desired that a saw tooth wave be utilized. In this case, the sine wave, as generated in block 10 of Fig. 2, may be first converted to saw tooth waves in two independent branches, for example, in blocks 11 and 12. The saw tooth voltage developed across R9 (output of block 11) may then represent the sine wave voltage developed across L (Fig. 1) for producing output pulses, and the saw tooth voltage developed across R12 may also represent the sine voltage developed across L (Fig. 1) for sampling as the output voltage; the sampling arrangement being similar to either one of Fig. 1 or Fig. 3. Due to the phase delay in sampling operation, as mentioned in the foregoing, the saw tooth voltage developed in block 12 of Fig. 2, is first phase delayed in block 13 in its sine wave state.

The circuit arrangement given in Fig. 1, for converting the sine wave into square wave, has, as mentioned in the foregoing, been exemplary, and other arrangements may also be utilized, for example, positive feed back from output to input circuit; trigger circuits operated by positive or negative lobes of the sine wave; or various other forms that are commonly used in the art of electronics. One form that may be worthy of mentioning here is the electron beam that may be shifted on and off upon two oppositely disposed anodes, for example, as shown in Fig. 4. In this arrangement, a source of electrons is condensed into a beam by the electron gun 14 and projected upon two anodes 15 and 16 simultaneously, as drawn. A pair of beam-deflecting plates 17 and 18 are then energized by the voltage wave (to be squared) arriving from block 19, to deflect the beam alternatingly on and off upon the anodes 15 and 16, thus converting the input into output square waves across output resistor R11. For the reasons of these many possible arrangements and modifications that may be incorporated with the present invention, it is to be understood that the invention will be defined only by the claims appended hereto.

What I claim is:

1. The system of transforming a produced signal from a first magnitude to a second magnitude, which comprises means for producing a signal to be transformed; means for producing auxiliary first and second substantially identical varying signals at first and second magnitudes, respectively, and at a frequency rate at least equal to or higher than the highest frequency rate that may occur in said produced signal; a coupling means having first and second input means and an output means; means for applying said first varying signal and said produced signal to said first and second input means, respectively, and means therefor for deriving at said output means a difference signal whose zero crossing coincides with the time period when said first signal and said produced signal are of equal magnitudes; amplifying means for amplifying said derived signal; wave-squaring means for squaring said amplified signal, the squared wave having zero crossing coincident in time with the zero crossing aforesaid; wave-differentiating means and means therefor for transforming the amplified squared wave into short pulses, said pulses being time coincident with the zero crossing of said derived signal; a signal-storage element; an electron discharge device, having at least a cathode element, an anode element, and an electron-intensity control element; means for applying said second varying signal upon said storage element in series with the cathode and anode elements of said discharge device; a bias source upon the control element of said discharge device for rendering it normally inoperative; and means for applying said pulses upon the control element of said discharge device for rendering it operative at the given instants, and thereby storing said second varying signal representative of the transformed signal aforesaid.

2. The system as set forth in claim 1, wherein said wave-squaring means comprises an electron discharge device having means for projecting an electron beam; a pair of anode elements intercepting said beam; a pair of beam deflecting means; and means for applying said derived amplified wave upon said deflecting means for switching said beam upon said pair of anodes alternately, the zero crossing coinciding with the zero value of said derived signal.

References Cited in the file of this patent

UNITED STATES PATENTS

| | | |
|---|---|---|
| 2,335,265 | Dodington | Nov. 30, 1943 |
| 2,500,536 | Goldberg | Mar. 14, 1950 |
| 2,532,338 | Schlesinger | Dec. 5, 1950 |
| 2,568,213 | Bath | Sept. 18, 1951 |
| 2,583,832 | Goldberg | Jan. 29, 1952 |
| 2,592,308 | Meacham | Apr. 8, 1952 |
| 2,662,113 | Schouten et al. | Dec. 8, 1953 |